United States Patent
Yamaoka et al.

(10) Patent No.: US 12,520,755 B2
(45) Date of Patent: Jan. 13, 2026

(54) MOWER WITH A CONTROLLER DEVICE

(71) Applicant: Chervon (HK) Limited, Wanchai (HK)

(72) Inventors: Toshinari Yamaoka, Nanjing (CN); Fangjie Nie, Nanjing (CN); Haishen Xu, Nanjing (CN); Xiandian Shao, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 832 days.

(21) Appl. No.: 17/854,815

(22) Filed: Jun. 30, 2022

(65) Prior Publication Data

US 2022/0330480 A1   Oct. 20, 2022

Related U.S. Application Data

(63) Continuation of application No. 17/570,156, filed on Jan. 6, 2022, now Pat. No. 12,364,192, which is a
(Continued)

(30) Foreign Application Priority Data

Oct. 15, 2012 (CN) .......................... 201210387914.9
May 3, 2013 (CN) .......................... 201220602040.X

(51) Int. Cl.
*A01D 34/82* (2006.01)
*A01D 34/00* (2006.01)
(Continued)

(52) U.S. Cl.
CPC ......... *A01D 34/828* (2013.01); *A01D 34/006* (2013.01); *A01D 34/68* (2013.01);
(Continued)

(58) Field of Classification Search
CPC .... A01D 34/828; A01D 34/006; A01D 34/68; A01D 34/6806; A01D 34/824;
(Continued)

(56) References Cited

U.S. PATENT DOCUMENTS

| | | |
|---|---|---|
| 1,387,578 A | 8/1921 | Yost |
| 1,850,326 A | 3/1932 | Kelly |

(Continued)

FOREIGN PATENT DOCUMENTS

| | | |
|---|---|---|
| CA | 2397429 A1 | 2/2004 |
| CH | 391387 A | 4/1965 |

(Continued)

OTHER PUBLICATIONS

Final Office Action, U.S. Appl. No. 16/722,589, Jun. 21, 2021, 11 pp.

(Continued)

*Primary Examiner* — Joseph M Rocca
*Assistant Examiner* — Robert E Pezzuto
(74) *Attorney, Agent, or Firm* — Greenberg Traurig, LLP

(57) ABSTRACT

A mower includes a main body having an electric motor configured to drive a mowing member, a pair of front wheels, and a pair of rear wheels. A supporting portion is associated with the main body and a handle is connected to the main body and rotatable between a first position and a second position. The handle comprises an operation assembly operable by a user to control the electric motor. A controller prevents the electric motor from being activated by a user operation of the operation assembly when the mower is in a first state in which the supporting portion and the pair of rear wheels are used to support the main body on a supporting surface with the handle in the first position.

14 Claims, 5 Drawing Sheets

Related U.S. Application Data continuation of application No. 17/209,722, filed on Mar. 23, 2021, now Pat. No. 11,246,262, which is a continuation of application No. 16/722,589, filed on Dec. 20, 2019, now Pat. No. 11,252,867, which is a continuation of application No. 15/238,276, filed on Aug. 16, 2016, now Pat. No. 10,524,420, which is a continuation of application No. 14/048,158, filed on Oct. 8, 2013, now Pat. No. 9,888,627.

(51) Int. Cl.
    *A01D 34/68*     (2006.01)
    *A01D 69/00*     (2006.01)
    *A01D 69/08*     (2006.01)
    *A01D 75/00*     (2006.01)
    *A01D 101/00*    (2006.01)

(52) U.S. Cl.
    CPC ....... *A01D 34/6806* (2013.01); *A01D 34/824* (2013.01); *A01D 69/08* (2013.01); *A01D 75/006* (2013.01); *A01D 2101/00* (2013.01)

(58) Field of Classification Search
    CPC ...... A01D 34/81; A01D 69/08; A01D 75/006; H01H 3/20; H01H 9/226; A47L 9/2863; A47L 9/2889; A47L 9/2842; G05G 5/005
    See application file for complete search history.

(56) References Cited

U.S. PATENT DOCUMENTS

| | | |
|---|---|---|
| 1,866,380 A | 7/1932 | Wagner |
| 1,896,442 A | 2/1933 | Farmer |
| 1,899,564 A | 2/1933 | Frey |
| 2,067,916 A | 1/1937 | Haffner et al. |
| 2,332,892 A | 10/1943 | Clemson |
| 2,347,991 A | 5/1944 | Cummings |
| 2,484,795 A | 10/1949 | Schofield |
| D158,847 S | 6/1950 | Flanigan |
| 2,513,685 A | 7/1950 | Smith et al. |
| 2,515,573 A | 7/1950 | Soenksen |
| 2,658,322 A | 11/1953 | Sullivan |
| 2,672,002 A | 3/1954 | Nelson |
| 2,688,834 A | 9/1954 | Kaeser |
| 2,702,448 A | 2/1955 | Smith |
| 2,715,808 A | 8/1955 | Heineke |
| 2,724,598 A | 11/1955 | Knarzer |
| 2,727,753 A | 12/1955 | Johnson et al. |
| 2,757,013 A | 7/1956 | Brier |
| 2,763,492 A | 9/1956 | Phelps |
| 2,786,694 A | 3/1957 | Gray |
| 2,791,079 A | 5/1957 | Funk |
| 2,791,437 A | 5/1957 | Knarzer |
| 2,809,490 A | 10/1957 | Oeters |
| 2,817,548 A | 12/1957 | Uthemann |
| 2,821,258 A | 1/1958 | Benson et al. |
| 2,829,483 A | 4/1958 | Oeters |
| 2,849,249 A | 8/1958 | Fridolph |
| 2,867,960 A | 1/1959 | Stiles |
| 2,965,386 A | 12/1960 | Buske |
| 2,966,365 A | 12/1960 | Kortum |
| 3,004,375 A | 10/1961 | Seyffer |
| 3,029,887 A | 4/1962 | Schantz |
| 3,035,719 A | 5/1962 | McClean |
| 3,038,737 A | 6/1962 | Lill |
| 3,089,301 A | 5/1963 | Przekop |
| 3,119,637 A | 1/1964 | Price |
| 3,130,444 A | 4/1964 | Stollsteimer |
| 3,142,950 A | 8/1964 | West |
| 3,144,258 A | 8/1964 | Ottosen et al. |
| 3,174,471 A | 3/1965 | Weglage et al. |
| 3,203,707 A | 8/1965 | Anlderson |
| 3,209,887 A | 10/1965 | Feldstein |
| 3,230,695 A | 1/1966 | West |
| 3,243,196 A | 3/1966 | Amis |
| 3,246,909 A | 4/1966 | Siwek |
| 3,253,391 A | 5/1966 | Meldahl |
| 3,357,716 A | 12/1967 | Musichuk |
| 3,423,103 A | 1/1969 | Maltarp |
| 3,462,924 A | 8/1969 | Erickson et al. |
| 3,465,505 A | 9/1969 | Krinke |
| 3,481,123 A | 12/1969 | Lessig, III |
| 3,485,017 A | 12/1969 | Duran et al. |
| 3,496,706 A | 2/1970 | Mattson |
| 3,527,469 A | 9/1970 | Gobin |
| 3,534,432 A | 10/1970 | Davies, III et al. |
| 3,603,065 A | 9/1971 | Weber |
| 3,604,187 A | 9/1971 | Weber |
| 3,642,051 A | 2/1972 | Goldner |
| 3,649,997 A | 3/1972 | Thorud |
| 3,659,170 A | 4/1972 | Burkett |
| 3,696,593 A | 10/1972 | Thorud |
| 3,702,016 A | 11/1972 | Keesee |
| 3,747,430 A | 7/1973 | Miner |
| 3,750,378 A | 8/1973 | Thorud |
| 3,756,336 A | 9/1973 | Mattingly |
| 3,764,156 A | 10/1973 | Nepper et al. |
| 3,809,837 A | 5/1974 | Yoshioka |
| 3,816,873 A | 6/1974 | Thorud et al. |
| 3,817,547 A | 6/1974 | Erickson |
| 3,823,291 A | 7/1974 | Milcoy |
| 3,855,763 A | 12/1974 | Seifert |
| 3,942,604 A | 3/1976 | Black, III |
| 3,958,017 A | 5/1976 | Morse et al. |
| 3,982,082 A | 9/1976 | Thorud et al. |
| 3,998,476 A | 12/1976 | Kazmark, Sr. |
| 4,003,190 A | 1/1977 | Braun |
| 4,015,406 A | 4/1977 | Witt et al. |
| 4,037,389 A | 7/1977 | Harkness |
| 4,041,679 A | 8/1977 | Seifert |
| 4,043,102 A | 8/1977 | Uhlinger et al. |
| 4,044,532 A | 8/1977 | Lessig, III |
| 4,054,394 A | 10/1977 | Neuman |
| 4,071,922 A | 2/1978 | Davies, III et al. |
| 4,108,456 A | 8/1978 | Woelffer et al. |
| 4,110,869 A | 9/1978 | Hastings |
| 4,161,639 A | 7/1979 | Nofel |
| 4,167,221 A | 9/1979 | Edmonson et al. |
| 4,181,333 A | 1/1980 | Stelma |
| 4,212,363 A | 7/1980 | Letner et al. |
| 4,216,363 A | 8/1980 | Nofel |
| 4,221,106 A | 9/1980 | Owens |
| 4,221,108 A | 9/1980 | Owens |
| 4,245,456 A | 1/1981 | Zipfel |
| 4,281,732 A | 8/1981 | Hoch |
| 4,316,355 A | 2/1982 | Hoff |
| 4,326,370 A | 4/1982 | Thorud |
| 4,327,541 A | 5/1982 | Emory |
| 4,362,228 A | 12/1982 | Plamper et al. |
| 4,363,206 A | 12/1982 | Schmitt |
| 4,392,538 A | 7/1983 | Goertzen |
| 4,394,893 A | 7/1983 | Kronich |
| 4,413,466 A | 11/1983 | Beugelsdyk et al. |
| 4,413,486 A | 11/1983 | Beugelsdyk et al. |
| 4,426,563 A | 1/1984 | Grogan |
| 4,428,180 A | 1/1984 | Carlson |
| 4,432,191 A | 2/1984 | Schmitt |
| 4,435,105 A | 3/1984 | Rampley |
| 4,476,643 A | 10/1984 | Hilchey et al. |
| 4,492,170 A | 1/1985 | Solomon |
| 4,503,958 A | 3/1985 | Nishio |
| 4,531,347 A | 7/1985 | Schutz |
| 4,561,239 A | 12/1985 | Cook |
| 4,573,307 A | 3/1986 | Wick |
| 4,596,484 A | 6/1986 | Nakatani |
| 4,599,912 A | 7/1986 | Barnard et al. |
| 4,603,478 A | 8/1986 | Anderson |
| 4,659,664 A | 4/1987 | Wollenhaupt |
| 4,659,884 A | 4/1987 | Wollenhaupt |
| 4,738,084 A | 4/1988 | Ogano et al. |
| 4,753,062 A | 6/1988 | Roelle |
| 4,757,885 A | 7/1988 | Kronich |
| 4,761,092 A | 8/1988 | Nakatani |

(56) References Cited

U.S. PATENT DOCUMENTS

| | | |
|---|---|---|
| 4,833,935 A | 5/1989 | Roelle |
| 4,850,182 A | 7/1989 | Barnard et al. |
| 4,870,811 A | 10/1989 | Steele |
| 4,882,897 A | 11/1989 | Oshima et al. |
| 4,899,446 A | 2/1990 | Akiba |
| 4,932,622 A | 6/1990 | Hayakawa |
| 4,936,160 A | 6/1990 | Barnard et al. |
| 4,981,011 A | 1/1991 | Olejak |
| 4,987,729 A | 1/1991 | Paytas |
| 5,020,308 A | 6/1991 | Braun et al. |
| 5,088,273 A | 2/1992 | Braun et al. |
| 5,138,824 A | 8/1992 | Oshima et al. |
| 5,146,735 A | 9/1992 | McDonner |
| 5,155,985 A | 10/1992 | Oshima et al. |
| 5,163,275 A | 11/1992 | Hare et al. |
| 5,195,307 A | 3/1993 | Thorud |
| 5,203,147 A | 4/1993 | Long |
| 5,209,051 A | 5/1993 | Langdon |
| 5,261,215 A | 11/1993 | Hartz et al. |
| 5,269,125 A | 12/1993 | Langley, Sr. et al. |
| 5,299,414 A | 4/1994 | Long |
| 5,301,494 A | 4/1994 | Peot |
| 5,307,612 A | 5/1994 | Tomiyama |
| 5,343,678 A | 9/1994 | Stuart |
| 5,511,367 A | 4/1996 | Powers |
| 5,517,809 A | 5/1996 | Rich |
| 5,558,210 A * | 9/1996 | Jonischus ............ H01H 9/226 200/321 |
| 5,591,109 A | 1/1997 | Strnad |
| 5,606,851 A | 3/1997 | Bruener et al. |
| 5,636,504 A | 6/1997 | Kaley et al. |
| 5,653,096 A | 8/1997 | Edwards |
| 5,692,366 A | 12/1997 | Hardesty |
| 5,692,856 A | 12/1997 | Newman, Jr. et al. |
| 5,746,074 A | 5/1998 | Collins |
| 5,772,162 A | 6/1998 | Lin |
| 5,784,868 A | 7/1998 | Wadzinski et al. |
| 5,791,805 A | 8/1998 | Lynch et al. |
| 5,806,374 A | 9/1998 | Mizutani et al. |
| 5,842,329 A | 12/1998 | Carter |
| 5,894,715 A | 4/1999 | Braun et al. |
| 6,006,434 A | 12/1999 | Templeton et al. |
| 6,078,015 A | 6/2000 | Martinez |
| 6,082,083 A | 7/2000 | Stalpes et al. |
| 6,095,294 A | 8/2000 | McGourthy, Sr. et al. |
| 6,101,678 A | 8/2000 | Malloy et al. |
| 6,124,791 A | 9/2000 | Wolf |
| 6,142,699 A | 11/2000 | Pao |
| 6,158,089 A | 12/2000 | Monahan et al. |
| 6,220,005 B1 | 4/2001 | Plamper et al. |
| 6,293,349 B1 | 9/2001 | Marshall |
| 6,317,930 B1 | 11/2001 | Hung |
| 6,404,078 B1 | 6/2002 | Thomas et al. |
| 6,449,935 B1 | 9/2002 | Nicolay et al. |
| 6,581,246 B1 | 6/2003 | Polette |
| 6,644,002 B2 | 11/2003 | Trefz |
| 6,658,829 B2 | 12/2003 | Kobayashi et al. |
| 6,698,173 B2 | 3/2004 | Joseph |
| 6,708,473 B2 | 3/2004 | Nicolay et al. |
| 6,737,598 B1 | 5/2004 | Allen |
| 6,751,936 B2 | 6/2004 | Kucera et al. |
| 6,796,392 B2 | 9/2004 | Kobayashi et al. |
| 6,902,024 B2 | 6/2005 | Miller et al. |
| 6,945,133 B2 | 9/2005 | Rush |
| 6,996,960 B1 | 2/2006 | Flemm |
| 6,996,963 B2 | 2/2006 | Peter et al. |
| 7,131,499 B2 | 11/2006 | Breneman et al. |
| 7,178,322 B2 | 2/2007 | Osborne |
| 7,179,200 B1 | 2/2007 | Wu |
| 7,231,755 B2 | 6/2007 | Clarke |
| 7,237,620 B2 | 7/2007 | Abenroth et al. |
| 7,240,756 B2 | 7/2007 | Derby, V |
| 7,263,817 B1 | 9/2007 | Smith |
| 7,263,818 B2 | 9/2007 | Osborne |
| 7,275,322 B2 | 10/2007 | Stones |
| 7,293,397 B2 | 11/2007 | Osborne |
| 7,314,096 B2 | 1/2008 | Shaffer et al. |
| 7,367,409 B2 | 5/2008 | Stones |
| 7,401,660 B2 | 7/2008 | Stones |
| 7,496,990 B2 | 3/2009 | Qiao |
| 7,523,600 B2 | 4/2009 | Sasaoka |
| 7,543,430 B2 | 6/2009 | Kaskawitz et al. |
| 7,591,126 B2 | 9/2009 | Cox |
| 7,624,998 B2 | 12/2009 | Barlow et al. |
| 7,707,812 B2 | 5/2010 | Cheung |
| 7,712,292 B2 | 5/2010 | Stover et al. |
| 7,762,049 B2 | 7/2010 | Eaton et al. |
| 8,098,036 B2 | 1/2012 | Matsunaga et al. |
| 8,132,289 B2 | 3/2012 | Hahn |
| 8,193,464 B2 | 6/2012 | Ahn |
| 8,274,004 B2 | 9/2012 | Selzer |
| 8,316,510 B2 | 11/2012 | Anraku |
| 8,359,821 B2 | 1/2013 | Park |
| 8,448,293 B2 | 5/2013 | Sepke |
| 8,635,744 B2 | 1/2014 | Junk et al. |
| 8,713,761 B2 | 5/2014 | Grewe et al. |
| 8,813,733 B2 | 8/2014 | Tamura et al. |
| 8,839,692 B2 | 9/2014 | Yanai et al. |
| 8,925,293 B2 | 1/2015 | Mikula et al. |
| 9,038,356 B2 | 5/2015 | Shao et al. |
| 9,060,463 B2 | 6/2015 | Yamaoka et al. |
| 9,109,616 B1 | 8/2015 | Ballentine |
| 9,179,597 B1 | 11/2015 | Kaspar |
| 9,218,924 B2 | 12/2015 | Coussins et al. |
| 9,232,962 B2 | 1/2016 | Bjorn et al. |
| 9,433,147 B2 | 9/2016 | Schmalz |
| 9,462,747 B2 | 10/2016 | Schmalz |
| 9,491,907 B2 | 11/2016 | Edholm et al. |
| 9,496,809 B2 | 11/2016 | Nakano et al. |
| 9,596,806 B2 | 3/2017 | Yamaoka et al. |
| 9,648,805 B2 | 5/2017 | Nie et al. |
| 9,651,138 B2 | 5/2017 | Helin et al. |
| 9,826,686 B2 | 11/2017 | Yamaoka et al. |
| 9,847,186 B2 | 12/2017 | Wadzinski |
| 9,855,490 B2 | 1/2018 | McGuffie |
| 9,888,627 B2 | 2/2018 | Yamaoka et al. |
| 9,955,627 B2 | 5/2018 | Nakano et al. |
| 9,986,686 B2 | 6/2018 | Yamaoka et al. |
| 10,039,229 B2 | 8/2018 | Wadzinski et al. |
| 10,070,588 B2 | 9/2018 | Yamaoka et al. |
| 10,111,381 B2 | 10/2018 | Shaffer et al. |
| 10,123,478 B2 | 11/2018 | Shaffer et al. |
| 10,433,478 B2 | 10/2019 | Smith et al. |
| 10,477,772 B2 | 11/2019 | Yamaoka et al. |
| 10,485,169 B2 | 11/2019 | Yamaoka et al. |
| 10,485,176 B2 | 11/2019 | Yamaoka et al. |
| 10,492,365 B2 | 12/2019 | Yamaoka et al. |
| 10,524,420 B2 | 1/2020 | Yamaoka et al. |
| 11,246,262 B2 | 2/2022 | Yamaoka et al. |
| 11,252,867 B2 | 2/2022 | Yamaoka et al. |
| 11,606,900 B2 | 3/2023 | Yamaoka et al. |
| 11,622,502 B2 | 4/2023 | Wei |
| 11,638,397 B2 | 5/2023 | Burns, III |
| 2003/0006074 A1 | 1/2003 | Ishikawa et al. |
| 2003/0093983 A1 | 5/2003 | Savard et al. |
| 2004/0194982 A1 | 10/2004 | Fukzumi et al. |
| 2005/0144919 A1 | 7/2005 | Osborne |
| 2006/0005673 A1 | 1/2006 | Long et al. |
| 2006/0053762 A1 | 3/2006 | Stover et al. |
| 2006/0053763 A1 | 3/2006 | Stover et al. |
| 2006/0075641 A1 | 4/2006 | Nottingham et al. |
| 2006/0075732 A1 | 4/2006 | Nottingham et al. |
| 2006/0096135 A1 | 5/2006 | Schaffer et al. |
| 2006/0127167 A1 | 6/2006 | Hsieh |
| 2006/0166792 A1 | 7/2006 | Kuo |
| 2007/0101690 A1 | 5/2007 | Stover et al. |
| 2007/0256401 A1 | 11/2007 | Hibi |
| 2007/0256402 A1 | 11/2007 | McCane et al. |
| 2008/0078156 A1 | 4/2008 | Qiao |
| 2008/0256919 A1 | 10/2008 | Schreiner |
| 2009/0025351 A1 | 1/2009 | Faeldan |
| 2009/0038281 A1 | 2/2009 | Kaskawitz et al. |
| 2009/0107282 A1 | 4/2009 | Mangham |
| 2009/0217636 A1 | 9/2009 | Loxterkamp |

(56) References Cited

U.S. PATENT DOCUMENTS

| | | |
|---|---|---|
| 2009/0293655 A1 | 12/2009 | Tseng et al. |
| 2010/0064650 A1 | 3/2010 | Mccane |
| 2010/0162674 A1 | 7/2010 | Eaton |
| 2010/0199949 A1 | 8/2010 | Tamura et al. |
| 2010/0229402 A1 | 9/2010 | Trethowan |
| 2011/0088362 A1 | 4/2011 | Rosa et al. |
| 2011/0126502 A1 | 6/2011 | Pitman et al. |
| 2011/0219565 A1 | 9/2011 | Sepke |
| 2011/0302893 A1 | 12/2011 | Park |
| 2011/0302895 A1 | 12/2011 | Park |
| 2012/0055277 A1 | 3/2012 | Wu |
| 2012/0305041 A1 | 12/2012 | Lah et al. |
| 2012/0317821 A1 | 12/2012 | Tsuchiya |
| 2012/0317948 A1 | 12/2012 | Abe et al. |
| 2012/0317949 A1* | 12/2012 | Abe .................. H01H 3/20 56/11.9 |
| 2012/0324682 A1 | 12/2012 | Ballentine et al. |
| 2013/0111866 A1* | 5/2013 | Schmalz ............ A01D 34/81 123/196 R |
| 2013/0212996 A1 | 8/2013 | Shao et al. |
| 2013/0305675 A1 | 11/2013 | Pare |
| 2014/0102063 A1 | 4/2014 | Yamaoka |
| 2014/0167398 A1 | 6/2014 | Burns et al. |
| 2014/0190141 A1 | 7/2014 | Edholm et al. |
| 2014/0196425 A1 | 7/2014 | Lewis |
| 2014/0331809 A1 | 11/2014 | Mikula |
| 2014/0374557 A1 | 12/2014 | Yu |
| 2016/0324065 A1 | 11/2016 | Smith et al. |
| 2017/0367258 A1 | 12/2017 | Shaffer et al. |
| 2020/0000030 A1 | 1/2020 | Wei et al. |
| 2020/0107497 A1 | 4/2020 | Ferrell et al. |
| 2020/0214209 A1 | 7/2020 | Yamaoka et al. |
| 2021/0243948 A1 | 8/2021 | Burns, III et al. |
| 2022/0124977 A1 | 4/2022 | Yamaoka et al. |
| 2022/0124982 A1 | 4/2022 | Yamaoka et al. |
| 2022/0279714 A1 | 9/2022 | Ro |
| 2022/0330480 A1 | 10/2022 | Yamaoka et al. |
| 2022/0346312 A1 | 11/2022 | Takahashi |
| 2022/0408640 A1 | 12/2022 | Hiller |
| 2023/0034760 A1 | 2/2023 | Fu |
| 2023/0073356 A1 | 3/2023 | Yamaoka et al. |
| 2024/0090373 A1 | 3/2024 | Hou |

FOREIGN PATENT DOCUMENTS

| | | |
|---|---|---|
| CN | 1299582 A | 6/2001 |
| CN | 101006763 A | 8/2007 |
| CN | 200953749 Y | 10/2007 |
| CN | 200993141 Y | 12/2007 |
| CN | 201044581 Y | 4/2008 |
| CN | 201146132 Y | 11/2008 |
| CN | 101516178 A | 8/2009 |
| CN | 201345826 Y | 11/2009 |
| CN | 201360427 Y | 12/2009 |
| CN | 201455951 U | 5/2010 |
| CN | 101822148 A | 9/2010 |
| CN | 101897261 A | 12/2010 |
| CN | 201821663 U | 5/2011 |
| CN | 102217455 A | 10/2011 |
| CN | 102232333 A | 11/2011 |
| CN | 202019551 U | 11/2011 |
| CN | 202026623 U | 11/2011 |
| CN | 102523817 A | 7/2012 |
| CN | 102683052 A | 9/2012 |
| CN | 202455826 U | 10/2012 |
| CN | 102845186 A | 1/2013 |
| CN | 202873363 U | 4/2013 |
| CN | 103283374 A | 9/2013 |
| CN | 203872585 U | 10/2014 |
| CN | 204119802 U | 1/2015 |
| CN | 104823599 A | 8/2015 |
| CN | 204796180 U | 11/2015 |
| CN | 104541737 A | 11/2016 |
| CN | 104114333 B | 3/2017 |
| CN | 106625459 A | 5/2017 |
| CN | 107046921 A | 8/2017 |
| CN | 107182426 A | 9/2017 |
| CN | 206596381 U | 10/2017 |
| CN | 207443478 U | 10/2017 |
| CN | 206629456 U | 11/2017 |
| CN | 105815028 A | 12/2017 |
| CN | 107455067 A | 12/2017 |
| CN | 206790995 U | 12/2017 |
| CN | 207120188 U | 3/2018 |
| CN | 108684299 A | 10/2018 |
| CN | 207940017 U | 10/2018 |
| CN | 108718664 A | 11/2018 |
| CN | 108834543 A | 11/2018 |
| CN | 109392418 A | 3/2019 |
| CN | 208798363 U | 4/2019 |
| CN | 110103110 A | 8/2019 |
| CN | 110636754 A | 12/2019 |
| CN | 106171253 B | 6/2020 |
| CN | 111406498 A | 7/2020 |
| CN | 111492805 A | 8/2020 |
| CN | 107920467 A | 4/2021 |
| DE | 2632526 A1 | 1/1978 |
| DE | 3827926 A1 | 2/1990 |
| DE | 3926098 A1 | 8/1995 |
| DE | 102004020985 A1 | 11/2005 |
| DE | 202004019453 U1 | 4/2006 |
| DE | 202006015259 U1 | 2/2007 |
| DE | 1020100443021 A1 | 3/2012 |
| DE | 102017205320 A1 | 10/2018 |
| EP | 0047416 A1 | 3/1982 |
| EP | 0185513 A1 | 6/1986 |
| EP | 0822346 A1 | 2/1998 |
| EP | 0903074 A1 | 3/1999 |
| EP | 0981945 A2 | 3/2000 |
| EP | 1106046 A1 | 6/2001 |
| EP | 1183931 | 3/2002 |
| EP | 1431998 A2 | 6/2004 |
| EP | 1543711 A2 | 6/2005 |
| EP | 1627560 A1 | 2/2006 |
| EP | 1741937 A1 | 1/2007 |
| EP | 1742008 A1 | 1/2007 |
| EP | 1792533 | 6/2007 |
| EP | 1949782 A1 | 7/2008 |
| EP | 1695608 B1 | 12/2009 |
| EP | 2425700 A2 | 3/2012 |
| EP | 2465337 A1 | 6/2012 |
| EP | 2491777 A1 | 8/2012 |
| EP | 2556739 A1 | 2/2013 |
| EP | 2622953 A1 | 8/2013 |
| EP | 2689651 A1 | 1/2014 |
| EP | 2774470 A1 | 9/2014 |
| EP | 2784335 A1 | 10/2014 |
| EP | 3381259 A1 | 10/2018 |
| FR | 2348644 A1 | 11/1977 |
| FR | 2489651 A3 | 9/1982 |
| FR | 3768300 A1 | 3/1999 |
| FR | 2768300 B1 | 11/1999 |
| FR | 2780375 A1 | 12/1999 |
| GB | 1064828 A | 4/1967 |
| GB | 2066033 A | 7/1981 |
| GB | 2139329 A | 9/1986 |
| GB | 2316458 A | 2/1998 |
| GB | 2386813 A | 10/2003 |
| GB | 2413254 A | 10/2005 |
| GB | 2449715 A | 12/2008 |
| JP | S63158120 U | 10/1988 |
| JP | H01162916 A | 6/1989 |
| JP | H01235516 A | 9/1989 |
| JP | H01312923 A | 12/1989 |
| JP | 02003226 U | 1/1990 |
| JP | H0530835 U | 2/1993 |
| JP | H0584102 U | 11/1993 |
| JP | H05284834 A | 11/1993 |
| JP | H06153650 A2 | 6/1994 |
| JP | H06153651 A | 6/1994 |
| JP | 11346530 A | 12/1999 |
| JP | 2003125627 A | 5/2003 |
| JP | 20030130017 A | 5/2003 |

(56) References Cited

FOREIGN PATENT DOCUMENTS

| | | | |
|---|---|---|---|
| JP | 4485316 | A | 4/2006 |
| JP | 2007116958 | A | 5/2007 |
| JP | 2008283926 | A | 11/2008 |
| JP | 2009034000 | A | 2/2009 |
| JP | 2009268437 | A | 11/2009 |
| JP | 2010274668 | A | 12/2010 |
| JP | 2011072211 | A | 4/2011 |
| JP | 20110272211 | A | 4/2011 |
| JP | 2013063052 | A1 | 4/2013 |
| JP | 2013066401 | A | 4/2013 |
| JP | 2013146241 | A | 8/2013 |
| JP | 2013153753 | A | 8/2013 |
| JP | 2013165676 | A | 12/2013 |
| JP | 2013247888 | A | 12/2013 |
| WO | 20030130017 | A | 5/2003 |
| WO | 2004086850 | A1 | 10/2004 |
| WO | 2007051553 | A1 | 5/2007 |
| WO | 2008026550 | A1 | 3/2008 |
| WO | 2011026416 | A1 | 3/2011 |
| WO | 2012115543 | A1 | 8/2012 |
| WO | 2013015171 | A1 | 1/2013 |
| WO | 2013122266 | A2 | 8/2013 |
| WO | 2018086034 | A1 | 5/2018 |
| WO | 2020230212 | A1 | 11/2020 |
| WO | 2021203646 | A1 | 10/2021 |

OTHER PUBLICATIONS

Final Office Action, U.S. Appl. No. 15/250,516, Jan. 29, 2018, 7 pp.
Final Office Action, U.S. Appl. No. 14/048,158, Apr. 21, 2016, 8 pp.
Non-Final Office Action, U.S. Appl. No. 17/209,722, Jun. 25, 2021, 12 pp.
Non-final Office Action, U.S. Appl. No. 14/511,490, Jan. 22, 2016, 6 pp.
Non-final Office Action, U.S. Appl. No. 16/722,589, Mar. 3, 2020, 6 pp.
Non-final Office Action, U.S. Appl. No. 16/722,589, Sep. 14, 2020, 9 pp.
Non-final Office Action, U.S. Appl. No. 14/048,158, Oct. 7, 2016, 13 pp.
Non-final Office Action, U.S. Appl. No. 14/058,158, Oct. 2, 2015, 9 pp.
One World's Initial Invalidity Contentions Exhibit I-1-420 Chart, Case No. 19-1923-LPS, 19 pp.
One World's Initial Invalidity Contentions Exhibits G-1-G-3 772 Chart, Case No. 19-1923-LPS, 69 pp.
One World's Initial Invalidity Contentions Exhibits H-1-H-2 176 Chart, Case No. 19-1923-LPS, 78 pp.
Rule 36 Judgment in IPRs 2020-0884, 2020-00886, 2020-00887, 2020-00888, Apr. 10, 2023, 3 pp.
U.S. Patent and Trademark Office, Non-Final Office Action issued in U.S. Appl. No. 16/670,821, dated Aug. 5, 2022, 8 pgs.
International Search and Written Opinion of application No. PCT/CN22/101474, dated Sep. 7, 2022, 7 pp.
Final Office Action from U.S. Appl. No. 16/824,858, dated Jan. 24, 2024, 14 pp.
Non-final Office Action from U.S. Appl. No. 19/068,586, dated Apr. 25, 2025. 9 pp.
Non-final Office Action from U.S. Appl. No. 17/570,032, dated Mar. 17, 2025, 13 pp.
"22in Recycler Lawn Mower." Toro. 2008. https://www.toro.com/getpub/43137 (Accessed Apr. 24, 2023.).
"34 A easyMove." Gardena. 2005. https://www.gardena.com/tdrdownload/pub000026260/doc000052340 (Accessed Apr. 27, 2023.).
"Battery-Powered Mower." Neuton. 2010. https://dam.generac.com/ImConvServlet/imconv/4486fd95f2c1b65d17be9d3697d6d93045070a4c/original (Accessed Apr. 27, 2023.), 28 pp.

"Viking MA 339 and MA 339 C premium battery-powered lawn mowers." Stihl. 2010. https://www.stihl-tirol.com/new-viking-ma-339-and-ma-339-c-premium-battery-powered-lawn-mowers.aspx (Accessed Apr. 27, 2023.).
ANSI 8.71.1-2012, American National Standard for Consumer Turf Care Equipment—Pedestrian-Controlled Mowers and Ride-On Mowers—Safety Specifications, 121 pp.
One World Technologies, Inc's Final Invalidity Contentions, CA. No. 19-1293-LPS, 52 pp, Dec. 17, 2020.
Ryobi Model No. BMM2400 Operator's Manual, 28 pp.
Ryobi Singer Corded and Cordless Mowers Service Manual, 52 pp.
American National Standard for Consumer Turf Care Equipment, "Pedestrian-Controlled Mowers and Ride-0n Mowers Safety Specifications," published Apr. 23, 2012, pp. 16-17.
Non-final Office action from U.S. Appl. No. 16/824,858, dated Jun. 5, 2023, 11 pp.
16 CFR Ch. II, part 1205 (2012), 15 pp.
Black and Decker CM2040 electric lawn mower manual, undated, 56 pp.
Canadian Intellectual Property Office, Office Action and Examination Search Report issued on CA Appl. No. 2,829,898. Jan. 27, 2015, 4 pp.
Cub Cadet CC 500 BAT electric lawn mower, undated, 50 pp.
Decision dated Dec. 7, 2020 for PGR2020-00059, 48 pp.
Decision dated Dec. 7, 2020 for PGR2020-00060, 57 pp.
Decision dated Dec. 7, 2020 for PGR2020-00061, 19 pp.
Decision dated Nov. 6, 2020 for IPR2020-00883, 24 pp.
Decision dated Nov. 6, 2020 for IPR2020-00884, 62 pp.
Decision dated Nov. 6, 2020 for IPR2020-00885, 43 pp.
Decision dated Nov. 6, 2020 for IPR2020-00886, 62 pages.
Decision dated Nov. 6, 2020 for IPR2020-00887, 55 pp.
Decision dated Nov. 6, 2020 for IPR2020-00888, 74 pp.
Earthwise CST00012 electric string trimmer, undated, 12 pp.
Final Office Action issued on U.S. Appl. No. 15/238,276, Aug. 2, 2019, 7 pp.
Final Office Action, U.S. Appl. No. 14/048,158, May 1, 2017, 29 pp.
Final Office Action, U.S. Appl. No. 15/250,476, Mar. 1, 2018, 11 pp.
Greenworks 21052 electric string trimmer, undated, 29 pp.
Greenworks 21212 electric string trimmer, undated, 26 pp.
Homelite UT41110 electric trimmer, undated, 16 pp.
IPR2020-00883—U.S. Pat. No. 9,060,463—Petition for Inter Partes Review filed May 1, 2020, 38 pp.
IPR2020-00884—U.S. Pat. No. 9,596,806—Petition for Inter Partes Review filed May 1, 2020, 73 pp.
IPR2020-00885—U.S. Pat. No. 9,648,805—Petition for Inter Partes Review filed May 1, 2020, 59 pp.
IPR2020-00886—U.S. Pat. No. 9,826,686—Petition for Inter Partes Review filed May 1, 2020, 75 pp.
IPR2020-00887—U.S. Pat. No. 9,986,686—Petition for Inter Partes Review filed May 1, 2020, 82 pp.
IPR2020-00888—U.S. Pat. No. 10,070,588—Petition for Inter Partes Review filed May 1, 2020, 95 pp.
Neuton CE6 electric lawn mower, undated, 74 pp.
Non-Final Office Action, U.S. Appl. No. 15/373,798, Apr. 19, 2019, 21 pp.
Non-Final Office Action, U.S. Appl. No. 15/373,840, Apr. 19, 2019, 14 pp.
Non-final Office Action, U.S. Appl. No. 15/238,276, Feb. 26, 2019, 14 pp.
Non-Final Office Action, U.S. Appl. No. 15/250,476, Oct. 13, 2017, 17 pp.
Non-Final Office Action, U.S. Appl. No. 15/250,516, Oct. 13, 2017, 16 pp.
Non-Final Office Action, U.S. Appl. No. 15/910,282, Jul. 30, 2019, 6 pp.
Non-Final Office Action, U.S. Appl. No. 16/406,337, Jul. 30, 2019, 8 pp.
One World's Initial Invalidity Contentions Exhibit D-1 686 Chart, Case No. 19-1923-LPS, 35 pp.
One World's Initial Invalidity Contentions Exhibits A-1-A-2 463 Chart, Case No. 19-1923-LPS, 19 pp.
One World's Initial Invalidity Contentions Exhibits B-1-B-6 806 Chart, Case No. 19-1923-LPS, 72 pp.

(56) References Cited

OTHER PUBLICATIONS

One World's Initial Invalidity Contentions Exhibits C-1-C-2 686 Chart, Case No. 19-1923-LPS, 37 pp.
One World's Initial Invalidity Contentions Exhibits E-1-E-4 588 Chart, Case No. 19-1923-LPS, 124 pp.
One World's Initial Invalidity Contentions Exhibits F-1-F-2 805 Chart, Case No. 19-1923-LPS, 37 pp.
One World's Initial Invalidity Contentions, Case No. 19-1293-LPS, 49 pp.
PGR2020-00059—Petition for Post-Grant Review of U.S. Pat. No. 10,477,772 filed May 1, 2020, 103 pp.
PGR2020-00060—Petition for Post-Grant Review of U.S. Pat. No. 10,485,176 filed May 1, 2020, 116 pp.
PGR2020-00061—Petition for Post-Grant Review of U.S. Pat. No. 10,524,420 filed May 1, 2020, 59 pp.
Recharge Ultralite PMLI-14 electric lawn mower, undated, 25 pp.
Ryobi RY14110 electric lawn mower, undated, 63 pp.
Ryobi RY40100 electric lawn mower, undated, 80 pp.
Sun Joe SB600E electric trimmer, undated, 15 pp.
Toro e-Cycler 20360 electric lawn mower, undated, 12 pp.
Worx WG789 electric lawn mower, undated, 58 pp.
Non-final Office Action from U.S. Appl. No. 17/941,652, dated Jun. 20, 2025, 11pp.

* cited by examiner

MOWER WITH A CONTROLLER DEVICE

RELATED APPLICATION INFORMATION

This application claims the benefit of and is a continuation of U.S. application Ser. No. 17/570,156, filed Jan. 6, 2022, which is a continuation of U.S. application Ser. No. 17/209,722, filed Mar. 23, 2021, which is a continuation of U.S. application Ser. No. 16/722,589, filed Dec. 20, 2019, now U.S. Pat. No. 11,252,867, which is a continuation of U.S. application Ser. No. 15/238,276, filed Aug. 16, 2016, now U.S. Pat. No. 10,524,420, which is a continuation of U.S. application Ser. No. 14/048,158, filed Oct. 8, 2013, now U.S. Pat. No. 9,888,627, which application claims the benefit of CN 201210387914.9, filed on Oct. 15, 2012, and CN 201220602040.X, filed on May 3, 2013, the disclosures of which are each incorporated herein by reference in their entirety.

FIELD OF THE DISCLOSURE

The subject disclosure relates to garden tools and, more particularly, to a mower with a controller device.

BACKGROUND

A commonly used lawncare apparatus, such as a walk-behind lawnmower, includes a cutting device, a deck supporting the cutting device, a chassis having four wheels to which the deck is mounted, and a handle for pushing a main body of the lawncare apparatus disposed at one end of the chassis.

When using the lawnmower, there are two ways to transport the lawnmower from a storage room to a lawn. The first way is to place the four wheels on the ground and push/pull the lawnmower. The second way is to lift the lawnmower away from the ground. The first way requires a large storage room and the second way requires that the lawnmower is of light weight. That is, the way to transport the lawnmower from the storage room to the lawn needs to be improved.

SUMMARY

The following will describe an apparatus which can improve operating comfort of the operator, reduce volume of the apparatus during transporting and/or storage, and further improve convenience of transporting.

To achieve the above object, a described apparatus includes a main body, a plurality of wheels supporting the main body, an accessory disposed in the main body, a motor driving the cutting blade, and an operating arm connected to the first end of the main body, wherein an elongated handle is disposed on the second end of the main body which is away from the operating arm. The operating arm includes a cylindrical gripping portion and the operating arm can be folded to a folded position. When the operating arm is at the folded position and the multiple wheels contacts the level surface, the distance in the horizontal direction between the axial central line of the cylindrical gripping portion and the axes of the elongated handle along the length direction is less than 5 cm.

To achieve the above object, another described apparatus includes a main body, a plurality of wheels supporting the main body, an accessory disposed in the main body, a motor driving the cutting blade, an operating arm connected to a first end of the main body, and an elongated handle positioned on a second end of the main body which is away from the operating arm. The operating arm is capable of being folded to a folded position and the internal profile of the operating arm is mated with the external profile of the elongated handle such that the operating arm at the folded position is clearance fitted with the elongated handle.

The apparatus of the invention can be pulled obliquely. Further, because of the structure mate relationship between the operating arm and the cylindrical gripping portion, the operator will feel more comfortable during the transporting process and the volume of the apparatus during transporting is reduced, and further, the convenience of transporting is improved.

DETAILED DESCRIPTION

The invention will be described below in details with reference to the drawings and preferred embodiments thereof.

Figure 1:
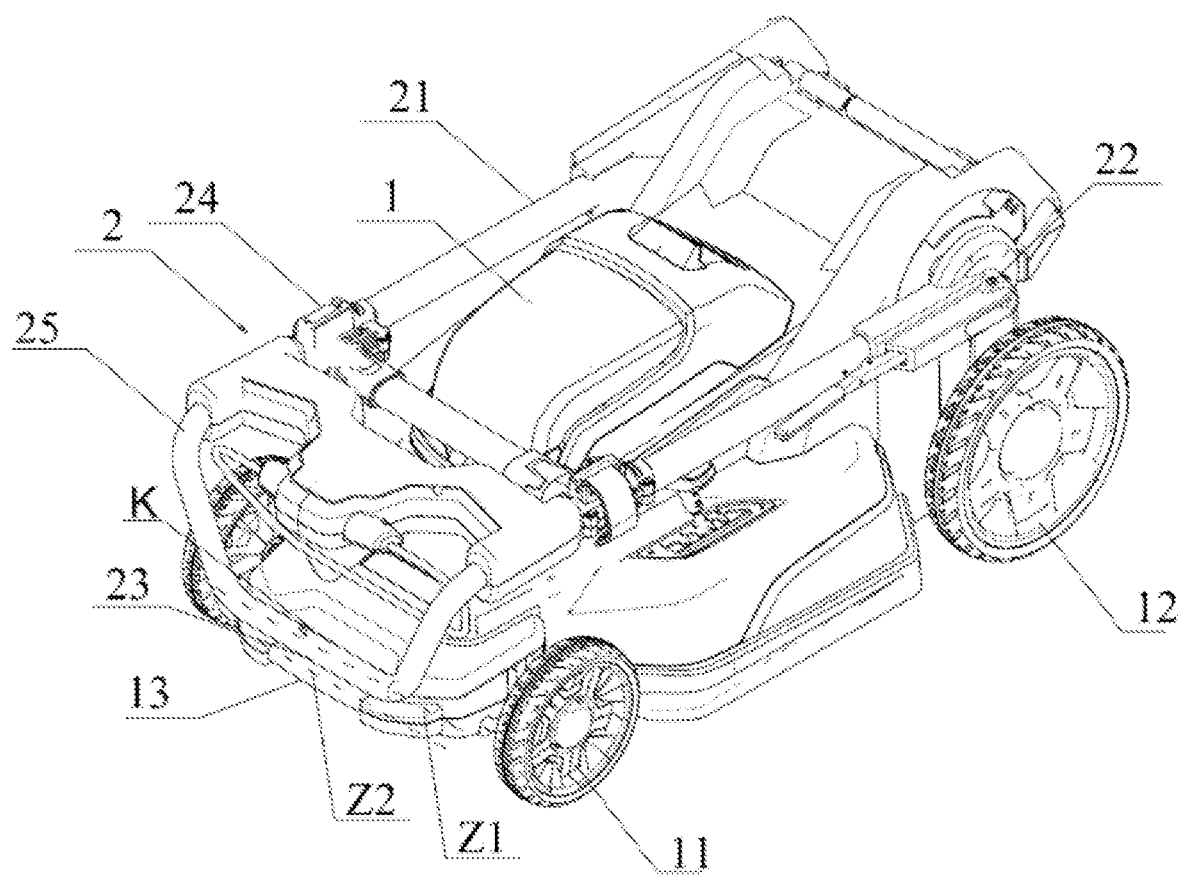
FIG. 1 is a schematic, isometric view showing an exemplary lawncare apparatus constructed according to the description which follows wherein an operating arm is folded.
Figure 2:
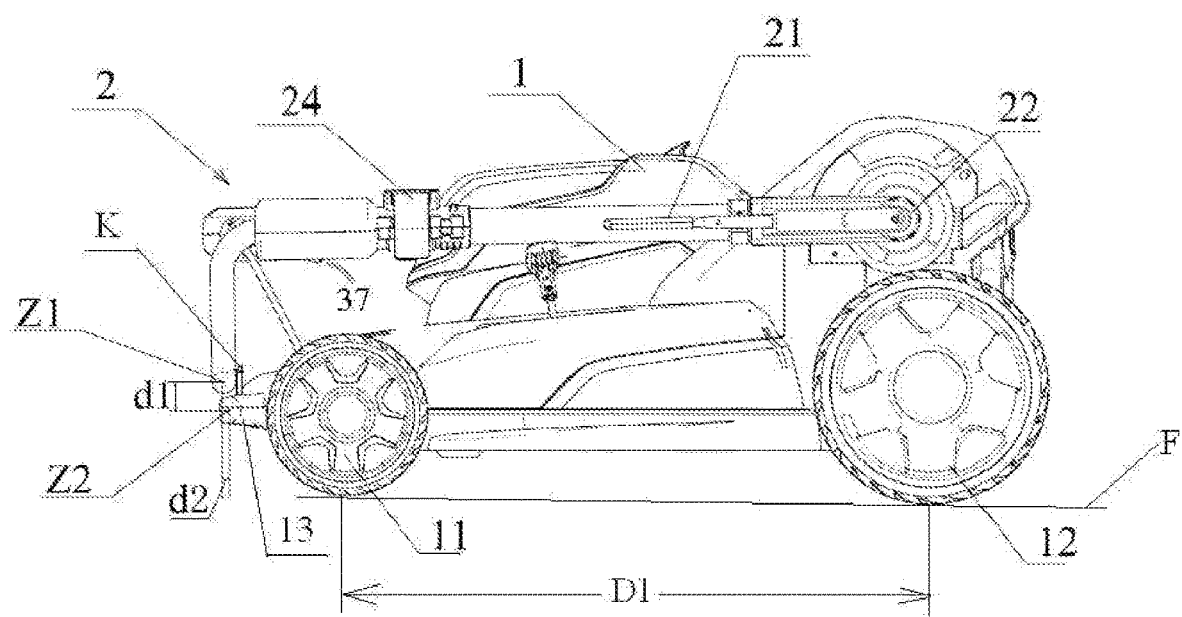
FIG. 2 is a side schematic view showing the exemplary lawncare apparatus of FIG. 1.

Referring to FIG. 1 and FIG. 2, in the illustrated embodiment, the lawncare apparatus is a hand push lawnmower. The lawncare apparatus includes a main body 1, a first pair of wheels 11 and a second pair of wheels 12 supporting the main body 1, a cutting blade disposed in the main body 1, a motor driving the cutting blade, and an operating arm 2 connected to the first end (rear end) of the main body 1. The first pair of wheels 11 and the second pair of wheels 12 are disposed respectively at the second end (front end) and the first end (rear end) of the main body 1. The operating arm 2 is pivotally connected to the rear end of the main body 1 by a pivot shaft 22 and positioned above the second pair of wheels 12. The front end of the main body 1, which is away from the operating arm 2, includes an elongated handle 13. In the illustrated embodiment the elongated handle 13 is substantially cylinder-shaped and includes an axis Z2 along the longitude direction. The operating arm 2 includes a cylindrical gripping portion 23 and can be folded to a folded position, and the cylindrical gripping portion 23 includes an axial central line Z1.

When the operating arm is at the folded position and the first pair of wheels 11 and the second pair of wheels 12 both contact the horizontal surface F, if the gripping portion 23 is above the handle 13, the distance d1 in the vertical direction between the axial central line Z1 and the axis Z2 along the longitude direction is greater than the sum of the radius of the gripping portion 23 and the radius of the cylinder-shaped handle 13, and the distance d1 is less than 5 cm. For example, the diameters of the gripping portion 23 and the cylinder-shaped handle 13 are both 1.5 cm, then the distance d1 is at least greater than 1.5 cm. Preferably, the distance d1 is 3 cm, and a distance d2 in the horizontal direction between the axial central line Z1 and the axis Z2 is also less than 5 cm, and in the illustrated embodiment, the distance d2 is preferably 0.5 cm. Therefore, when the operating arm 2 is at the folded position, the user can grip both the gripping portion 23 and the cylinder-shaped handle 13 conveniently.

Additionally, in an alternative embodiment, to allow the user to grip both the gripping portion 23 and the cylinder-shaped handle 13 more conveniently, the internal profile of the gripping portion 23 is mated with the external profile of the cylinder-shaped handle 13, such that when the operation arm 2 is at the folded position, the outer surface of the gripping portion 23 and the cylinder-shaped handle 13 contact with each other. At this time, the gripping portion 23 and the cylinder-shaped handle 13 can lie in a horizontal plane, the distance d2 in the horizontal direction between the axial central line Z1 and the axis Z2 is larger than the sum of the radius of the gripping portion 23 and the radius of the cylinder-shaped handle 13, and the distance d1 is zero. It should be noted that the external profile of the gripping portion 23 may be designed to mate with the internal profile of the cylinder-shaped handle 13.

To allow the user to grip both the gripping portion 23 and the cylinder-shaped handle 13 more stably, a clip K is disposed on the handle 13. When the operation arm is at the folded position, the clip K is engaged with the cylindrical gripping portion 23.

Further, in the illustrated embodiment, the operating arm 2 is extendable, and a safety switch assembly 240 is disposed in the operating arm 2, the operating arm 2 includes an inner pipe 25 and an outer pipe 21, the outer pipe 21 is rotatably connected to the rear end of the main body 1 by the pivot shaft 22, and the end of the outer pipe 21 includes a pipe sleeve 24.

Figure 3:
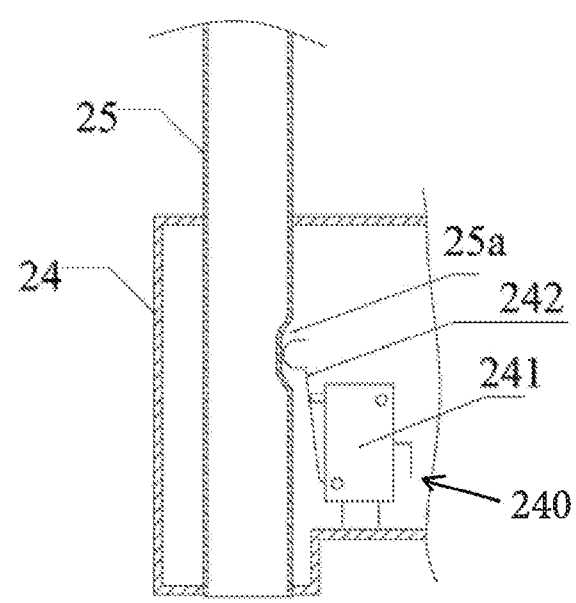
FIG. 3 is a schematic view showing an exemplary safety switch assembly of the lawncare apparatus of FIG. 1.

Referring to FIG. 3, the safety switch assembly 240 is disposed in the sleeve pipe 24 and a safety shift structure 25*a* is disposed in the inner pipe 25. The safety switch assembly 240 includes a safety switch 241 and a trigger assembly 242 configured to trigger the safety switch 241 when the safety shift structure 25*a* of the inner pipe 25 is disengaged from a safety location and reset the safety switch 241 when the safety shift structure 25*a* returns to the safety location. The safety switch 241 is electrically connected to a control circuit for controlling the motor in the main body 1.

In the embodiment, the trigger assembly 242 is a contacting spring sheet. One end of the contacting spring sheet is connected to the safety switch 241 and the other end is a free end. When the inner pipe 25 slides, the wall of the inner pipe 25 presses the contacting spring sheet to trigger the safety switch 241. The the contacting spring sheet 242 is formed with elasticity. When the inner pipe 25 slides, the safety shift structure 25*a* moves back to the safe position and, at this time, the safety shift structure 25*a* is within a receiving groove configured to accommodate the contacting spring sheet, and the contacting spring sheet 242 is out of outer force and will not trigger the safety switch 241.

When the inner pipe 25 is retracted into the outer pipe 21, the safety shift structure 25*a* leaves the safe position and the wall of the inner pipe 25 presses the contacting spring sheet 242 to trigger the safety switch. At this time, even during the transporting process, if the user operates the operating switch by mistake, the motor cannot be started, which can reduce the possibility of danger happening to the user.

Figure 4:
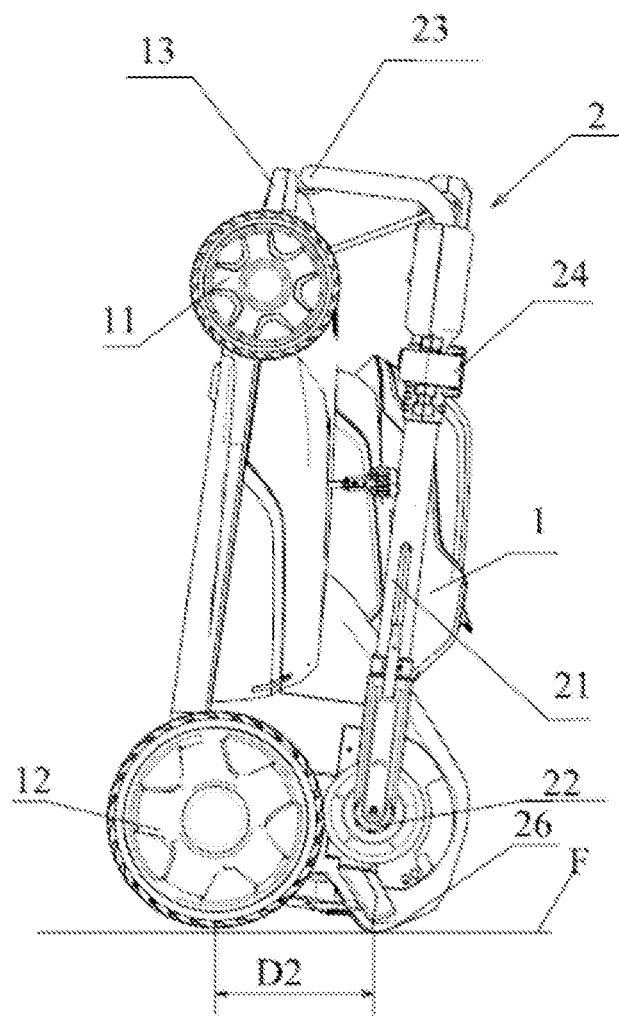
FIG. 4 is a side schematic view showing the lawncare apparatus of FIG. 1 in a storage position.

Additionally, referring to FIG. 2 again, when the lawnmower is at the using position, the first pair wheels 11 and the second pair wheels 12 are supported on the supporting surface F. If light is shining from a direction perpendicular to the supporting surface F, the main body 1 of the lawnmower projects a first orthographic projection on the supporting surface F. Referring to FIG. 4, the lawnmower is at the storage position. When the lawnmower is stored, the lawnmower stands uprightly for storing in a storage room and the operating arm 2 is folded and only the second wheels 2 are supported on the supporting surface F. For improving stability, a supporting portion 26 is disposed on the main body 1 for supporting on the supporting surface F, and the supporting portion can be integrated with or separated from the main body 1. In the same way, at this time if light is shining from a direction perpendicular to the supporting surface F, the main body 1 of the lawnmower projects a second orthographic projection on the supporting surface F. Since the width of the lawnmower at the using position is the same as that of the lawnmower at the storage position, and the distance D1 between the first pair wheels 11 and the second pair wheels 12 is larger than the distance D2 between the first pair of wheels 11 and the supporting portion 26, the first orthographic projection area of the lawnmower at the using position is larger than the second orthographic projection area of the lawnmower at the storage position.

Figure 5:
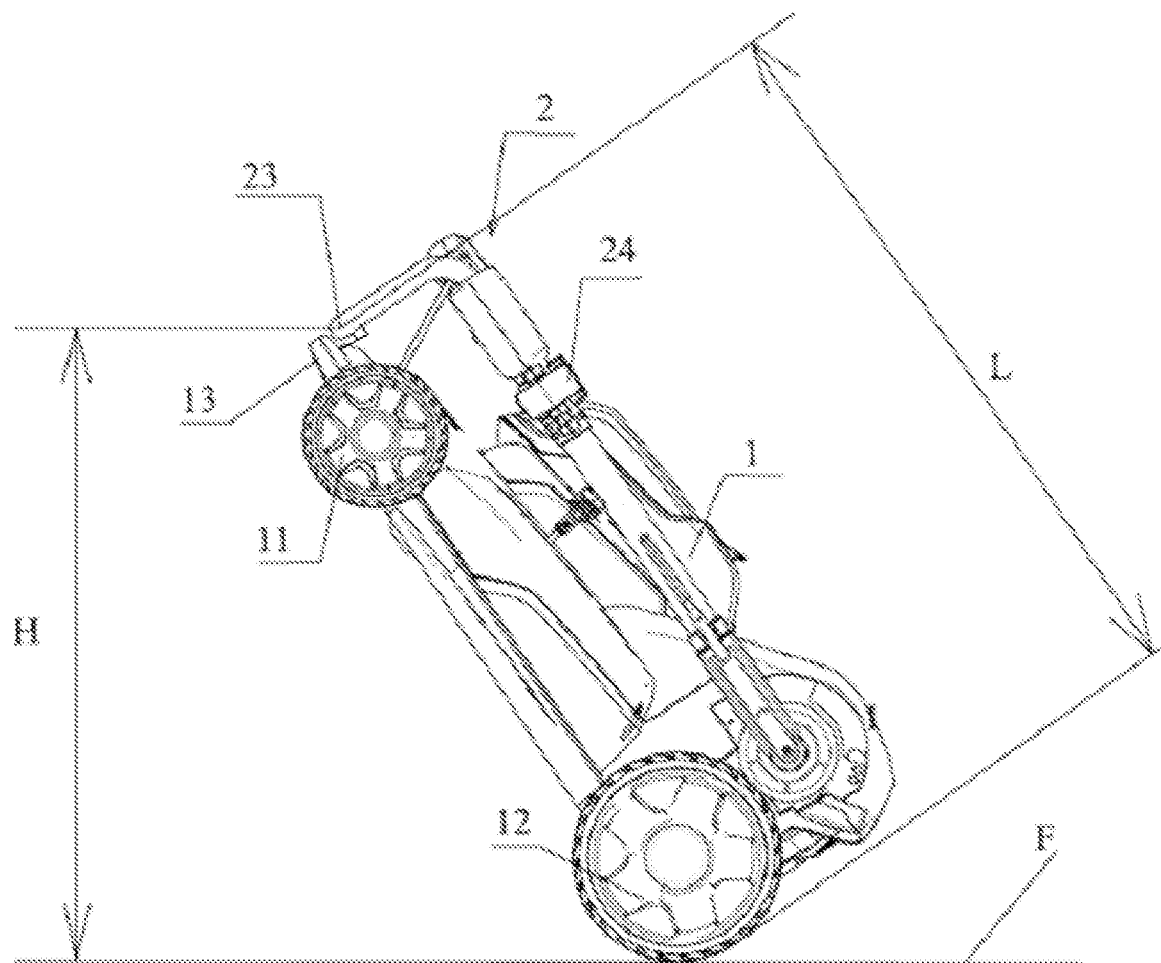
FIG. 5 is a side schematic view showing the lawncare apparatus of FIG. 1 in an obliquely disposed, pulling position.

Referring to FIG. 5, when the lawnmower is changed from the using position to the obliquely pulled position, only the second pair wheels 12 contact the supporting surface and the hands of the user grip a pull portion which is preferably the cylindrical gripping portion 23. At this time, the operating arm 2 is at the folded position, the distance of the gripping portion 23 relative to the supporting surface F is H; the distance of the gripping portion 23 relative to the point the second pairs wheels 12 contacting the supporting surface F is L, and the ratio of H to L may be 0.5~1, preferably 0.8~0.9, for meeting the needs of ergonomics. Therefore, when pulling the lawnmower, only part of the weight of the lawnmower is supported by the user, which makes the user feel more labor-saving.

From the above, the described lawncare apparatus can be pulled obliquely, and because of the structure mate relationship between the operating arm and the cylindrical gripping portion, the user can feel more comfortable during transporting and the pulling process is more stable, so that the volume of the lawncare apparatus during transporting is reduced and the operability of lawnmower pulling is improved. Since a safety switch mechanism is disposed on the operating arm, misoperation of the lawncare apparatus can be avoided and safety of pulling is improved.

The general principle, primary features and advantages of the invention have been illustrated and described above. Those skilled in the art will appreciate that the foregoing embodiments are not intended to limit the invention in any form and technical implementations derived with equal substitutions or equivalent variations shall be considered as falling within the scope of the claimed invention.

We claim:

1. A mower, comprising:
   a main body comprising an electric motor configured to drive a mowing member, a pair of front wheels, and a pair of rear wheels;
   a supporting portion associated with the main body;
   a handle connected to the main body and rotatable between a first position and a second position wherein the handle further comprises an operation assembly operable by a user to control the electric motor; and
   a controller device, wherein the controller device prevents the electric motor from being activated by a user operation of the operation assembly when the mower is in a first state in which the supporting portion and the pair of rear wheels are used to support the main body on a supporting surface with the handle in the first position, and wherein a distance D1 between the pair of front wheels and the pair of rear wheels is larger than a distance D2 between the pair of rear wheels and the supporting portion such that a first orthographic projection area of the mower in the second position is larger than a second orthographic projection area of the mower in the first position.

2. The mower as recited in claim 1, wherein the controller device allows the electric motor to be activated by the user operation of the operation assembly when the mower is in a second state in which the pair of front wheels and the pair of rear wheels are used to support the main body on the supporting surface with the handle in the second position.

3. The mower as recited in claim 1, wherein the handle is folded adjacent to the main body in the first position of the handle.

4. The mower as recited in claim 2, wherein the handle is extended away from the main body in the second position of the handle.

5. The mower as recited in claim 1, wherein the controller device prevents the electric motor from being activated by the user operation of the operation assembly when the mower is in the first state and the supporting portion and the pair of rear wheels are used to support the main body on the supporting surface with the front wheels not touching the supporting surface.

6. A mower, comprising:
a main body comprising an electric motor configured to drive a mowing member, a pair of front wheels, and a pair of rear wheels;
a supporting portion associated with the main body;
a handle connected to the main body and rotatable between a plurality of positions including at least one operating position and at least one folded position wherein the handle further comprises an operation assembly mounted to the handle and operable by a user to control the electric motor; and
a controller device, wherein the controller device prevents the electric motor from being activated by a user operation of the operation assembly when the supporting portion of the mower is rotated into a vertical position with the rear wheels touching a support surface and the front wheels not touching the support surface,
wherein the supporting portion is at least one of integrated with or separated from the main body and the pair of rear wheels are intermediate the pair of front wheels and the supporting portion.

7. The mower as recited in claim 6, wherein the controller device stops the electric motor from driving the mowing member when the mower is rotated into the vertical position.

8. The mower as recited in claim 6, wherein the controller device stops the electric motor from driving the mowing member when the handle is not located in one of the at least one operating position.

9. The mower as recited in claim 6, wherein the handle is telescopically extendable and the controller device stops the electric motor from driving the mowing member when the handle is not fully telescopically extended.

10. The mower as recited in claim 6, wherein the handle is adjacent to the main body in the at least one folded position.

11. The mower as recite in claim 6, wherein the handle is extended away from the main body in the at least one operating position.

12. The mower as recited in claim 6, wherein a distance D1 between the pair of front wheels and the pair of rear wheels is larger than a distance D2 between the pair of rear wheels and the supporting portion such that a first orthographic projection area of the mower in the at least one operating position is larger than a second orthographic projection area of the mower in the at least one operating position.

13. A mower, comprising:
a main body comprising an electric motor configured to drive a mowing member, a pair of front wheels, and a pair of rear wheels;
a supporting portion associated with the main body;
a handle connected to the main body and rotatable between a first position and a second position wherein the handle further comprises an operation assembly operable by a user to control the electric motor; and
a controller device, wherein the controller device prevents the electric motor from being activated by a user operation of the operation assembly when the mower is in a first state in which the supporting portion and the pair of rear wheels are used to support the main body on a supporting surface with the handle in the first position, and
wherein the supporting portion is integrated with the main body and the pair of rear wheels are intermediate the pair of front wheels and the supporting portion.

14. A mower, comprising:
a main body comprising an electric motor configured to drive a mowing member, a pair of front wheels, and a pair of rear wheels;
a supporting portion associated with the main body;
a handle connected to the main body and rotatable between a first position and a second position wherein the handle further comprises an operation assembly operable by a user to control the electric motor; and
a controller device, wherein the controller device prevents the electric motor from being activated by a user operation of the operation assembly when the mower is in a first state in which the supporting portion and the pair of rear wheels are used to support the main body on a supporting surface with the handle in the first position, and
wherein the supporting portion is separated from the main body and the pair of rear wheels are intermediate the pair of front wheels and the supporting portion.

\* \* \* \* \*